United States Patent [19]

Cooper

[11] 4,430,466

[45] Feb. 7, 1984

[54] BENZOTHIAZYL SULFENAMIDES AS SCORCH RETARDANTS FOR MERCAPTOSILANE-COUPLED SILICA FILLED-RUBBER COMPOUNDS

[75] Inventor: William T. Cooper, Bartlesville, Okla.

[73] Assignee: Phillips Petroleum Company, Bartlesville, Okla.

[21] Appl. No.: 387,097

[22] Filed: Jun. 10, 1982

Related U.S. Application Data

[63] Continuation-in-part of Ser. No. 350,685, Feb. 22, 1982, abandoned.

[51] Int. Cl.$^3$ .......................... C08K 3/36; C08K 3/34; C08K 5/54; C08K 5/46
[52] U.S. Cl. ...................................... 524/83; 523/213; 524/262; 524/762; 524/765
[58] Field of Search .................. 524/83, 262; 523/212, 523/213; 260/762, 765

[56] References Cited

U.S. PATENT DOCUMENTS 2,886,550   5/1959   Goren ................................. 524/445
4,229,333  10/1980   Wolff et al. ....................... 260/762

FOREIGN PATENT DOCUMENTS 2145110   3/1973   Fed. Rep. of Germany ........ 524/83

OTHER PUBLICATIONS

Chem. Abs., 95-99129v, Davies et al., (1981).
Chem. Abs., 93-73364, Davies et al., (1980).

Primary Examiner—John C. Bleutge
Assistant Examiner—Herbert J. Lilling

[57] ABSTRACT

In a sulfur-curable conjugated diene rubber compound formulation containing a silica reinforcing filler and a mercaptoalkyltrialkoxysilane coupling agent, the improvement which comprises increasing time-to-scorch by employing benzothiazyl sulfenamide accelerators at levels of above at least 1.5 phr.

24 Claims, No Drawings

BENZOTHIAZYL SULFENAMIDES AS SCORCH RETARDANTS FOR MERCAPTOSILANE-COUPLED SILICA FILLED-RUBBER COMPOUNDS

This is a continuation-in-part of application Ser. No. 350,685, filed Feb. 22, 1982, and now abandoned.

FIELD OF THE INVENTION

The invention pertains to a process for curing a conjugated diene natural or synthetic rubber which contain siliceous reinforcing filler and a mercapto silane coupling agent. In another aspect, the invention pertains to a method to increase the time-to-scorch of sulfur-curable poly(conjugated diene) compounds containing siliceous reinforcing fillers and mercaptosilane coupling agents. In a further aspect, the invention pertains to sulfur-curable poly(conjugated diene) compounds with increased time-to-scorch. In a related aspect, the invention relates to vulcanized sulfur-cured stocks.

BACKGROUND OF THE INVENTION

Sulfur-vulcanizable rubber compounded stocks based on conjugated diene polymers have employed carbon black in one or other of its various forms as the reinforcing filler of choice to provide the usually desirable jet-black color, as a filler (diluent), and to add desirable properties of life, abrasion resistance, and the like, particularly for making tires. The carbon blacks have been readily available and relatively cheap.

However, in recent years, the costs of the available base oils/natural gas for producing carbon blacks have been increasing radically. There also has been a trend toward lighter-colored vulcanizable stocks for some purposes.

As a consequence, the use of siliceous fillers such as silica in sulfur-vulcanizable rubber compounds has been receiving increasing attention. Not too long ago siliceous fillers were considered "high cost", and not likely ever to replace carbon black more than fractionally, particularly in view of some difficulties experienced in obtaining satisfactory results in sulfur vulcanizable stocks. However, the costs of siliceous fillers are dropping with increasing usages and improved technology.

Use of siliceous fillers, however, requires a coupling agent to adequately bond the siliceous filler to the rubber to provide sulfur-vulcanizable rubber vulcanizates with desirable tensile strength, modulus, and hardness. The silane coupling agents, however, reduce the time-to-scorch of the rubber compounds during curing, making processing such as extrusion and injection molding of the rubber compounds very difficult. Efforts have been made to add still another component to the compounded stocks to overcome the disadvantages. These have not been too successful, and every added component means added complexities in compounding since each new component tends to affect the balance of the other components.

SUMMARY OF THE INVENTION

I have discovered that the time to scorch of sulfur-vulcanizable rubber compounds comprising a conjugated diene polymer, a siliceous filler alone or in combination with a carbon black, a mercaptoalkylalkoxysilane coupling agent, a sulfur-curative system, optionally an extender oil, and at least one benzothiazyl sulfenamide accelerator, surprisingly can be significantly prolonged simply by increasing the level of the benzothiazyl sulfenamide accelerator to over 1.5 phr, levels heretofore never considered, as far as I am aware, in the rubber compounding arts. By adding a significantly higher quantity of an ingredient already used in compounding, the time-to-scorch is significantly improved, and I avoid the difficulties heretofore attendant with adding a further ingredient.

Additional benefits, and quite unexpected, from the use of the level of over 1.5 phr of a benzothiazyl sulfenamide is that the hysteretic heat generation of the cured rubber compositions is lowered, their resilience is enhanced, and yet the tensile properties are not significantly affected. The benzothiazyl sulfenamides also are called benzothiazolesulfenamides or benzothiazolsulfenamides in various references and handbooks.

DETAILED DESCRIPTION OF THE INVENTION

Sulfur-Vulcanizable Rubbers

The sulfur-vulcanizable rubbers that benefit from the formulations of my invention are broadly described as diene polymers, using that term in the broadest sense to include both natural and synthetic rubbers including mixtures thereof, which are rubbery, normally solid, and can be unsaturated or partially hydrogenated so long as they contain sufficient residual unsaturation as to permit sulfur vulcanization. The synthetic diene rubbers include conjugated diene homopolymers, copolymers of two or more conjugated dienes, and copolymers thereof with monovinylarenes or other suitable copolymerizable monomers.

Any of the conjugated diene-based synthetic rubbers are suitable, as long as they meet the above criteria. The conjugated dienes employed to make such polymers usually are of 4 to 12 carbon atoms per molecule, such as butadiene, isoprene, piperylene, octadiene, and the like. Monovinylarenes, where employed, can be incorporated into the diene polymer by copolymerization in admixture with the diene, or by sequential addition, optionally by coupling reactions to form linear or radial copolymers, all by means known in the art in solution polymerization modes, emulsion polymerization, bulk polymerization, and the like. Monovinylarenes of present particular interest are styrene and the methyl-substituted styrenes. However, any of the known monovinylarenes are suitable with those in the range of 8 to 12 carbon atoms of most interest because of their commercial availability. Various other comonomers can be employed as known in the art to prepare the sulfur-vulcanizable diene rubbers.

The sulfur-vulcanizable diene polymers include such as butadiene homopolymers, cis-polybutadiene, polyisoprene, isoprene/styrene copolymers, butadiene/styrene (SBR) copolymers, butadiene/acrylonitrile rubbers, ethylene-propylene-diene terpolymers (EPDM rubber), neoprene, chloroprene, nitrile rubbers, butyl rubbers, and the like.

My invention is also applicable in one aspect to compositions of natural rubber, SBR, or blends thereof. A natural rubber particularly useful is that termed standard Maylasian rubber SMR-5L. A presently preferred synthetic rubber is cis-4 polybutadiene having a cis-configuration of the order of 91–92 percent and a Mooney viscosity of about 45 at 212° F. Blends of these are particularly useful in accordance with the present invention in my experience.

Siliceous Fillers

Siliceous fillers employed in my inventive sulfur-curable rubber compositions include silicas such as finely divided, hydrated, amorphous silicas obtained by precipitation of soluble silicates. Among the suitable silicas are those having a specific gravity of about 1.5 to 2.5, preferably about 1.9–2.2, and an average surface area (measured by BET nitrogen adsorption) of about 20 to 300 m$^2$/gram. Other, though presently less preferred, siliceous fillers that can be employed include finely divided clays, kaolin, hydrated aluminum silicates, magnesium silicates (talc), calcium silicates, mixtures of any of these including mixtures with silica.

A presently preferred siliceous filler is Hi Sil 233, a commercial, precipitated, hydrated, amorphous silica with a specific gravity of about 2.0 g/cc, a surface area (BET method) of 140 to 160 m$^2$/gram, and being finer than 325 mesh (ultimate particle size: 0.022 microns), marketed by Harwick Chemical Corp. and PPG Industries.

Silane Coupling Agents

The silane coupling agents employed are mercaptoalkoxysilane coupling agents termed the mercaptoalkyltrialkoxysilanes and which can be represented by the general structure (OR)$_3$SiR$^1$SH in which R and R$^1$ are alkyl groups of 1 to 10, preferably 1 to 4 carbon atoms. Examples include 3-mercaptopropyltrimethoxysilane, 3-mercaptopropyltriethyoxysilane 2-mercaptoethyltrimethyoxysilane, and 2;1 -mercaptoethyltriethoxysilane. The presently preferred mercaptoalkoxysilane coupling agent is 3-mercaptopropyltrimethoxysilane, marketed by Union Carbide as Silane A-189.

The siliceous filler and the coupling agent can be added in any of several stages of rubber compounding. The coupling agent can be admixed with the siliceous filler prior to incorporating the mixture into the rubber batch. The coupling agent can be incorporated into a priorly prepared coprecipitated silica latex masterbatch. The coupling agent can be incorporated into the rubber prior to incorporation therein of the siliceous filler, or added separately but coincidentally to the rubber batch along with the silicheous filler, during mixing such as in a standard Banbury mixer. The coupling agent, depending on the particular material employed, can be in a vapor form, or dissolved in an organic solvent, or dissolved in and/or suspended in water as may be convenient.

The weight ratio of silane coupling agent to siliceous filler generally ranges from about 1:100 to 1:5, more preferably about 1:25 to 1:13.

Vulcanization Accelerators

Vulcanization accelerators employed according to my invention at levels above 1.5 phr are the benzothiazyl sulfenamides. These accelerators are described in U.S. Pat. No. 3,852,250, incorporated herein by reference, as having a structural formula which can be represented by:

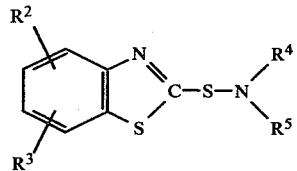

wherein each R$^2$ and R$^3$ is individually selected from hydrogen, nitro, chloro, alkyl radicals having 1 to 4 carbon atoms, and alkoxy radicals having 1 to 4 carbon atoms; R$^4$ is selected from the group consisting of alkyl radicals having 1 to 6 carbon atoms, aryl radicals having 6 to 13 carbon atoms; R$^4$ and R$^5$ can be joined through a member selected from the group consisting of —CH$_2$—, —O—, and —S— to constitute with the attached nitrogen group a heterocyclic radical; and R$^5$ is individually selected from the group defined by R$^4$ and hydrogen.

Examples include such as N-t-butyl-2-benzothiazyl sulfenamide, N-cyclohexyl-2-benzothiazyl sulfenamide, N-isopropyl-2-benzothiazyl sulfenamide, N-oxydiethylene-2-benzothiazyl sulfenamide, also called 2-(4-morpholinothio)-benzothiazole, N,N-diisopropyl-2-benzothiazyl sulfenamide, N,N-diethyl-2-benzothiazyl sulfenamide, N,N-dicyclohexyl-2-benzothiazyl sulfenamide, and 2-(4-morpholinodithio)-benzothiazole. The presently preferred benzothiazyl sulfenamide is N-cyclohexyl-2-benzothiazyl sulfenamide, presently marketed by Harwick Chemical Corporation, Akron, Ohio under the tradename of Santocure.

Carbon Blacks

Siliceous fillers can replace carbon black in whole or in part in sulfur-vulcanizable diene compounded stocks. Also, a mixture of a siliceous filler and a carbon black can be employed. The carbon black employed in admixture with siliceous fillers can be any of the commercially available carbon blacks listed in ASTM 1765–76 Table I expressly incorporated herein by reference.

Generally the amount of carbon black in admixture with siliceous fillers can be any desired ratio, such as about 1:99 to 99:1 weight ratio. Generally, where both a carbon black and a siliceous filler are employed, the weight ratio of carbon black to siliceous filler will range from about 1:20 to 1:1, most preferably about 1:2.2.

A presently preferred admixture employs about 40 phr (parts per 100 parts of rubber) of a siliceous filler such as Hi Sil 233, and about 18 phr of a carbon black, such as Philblack N 234 having an average particle size of 19 millimicrons, an average surface area of 125 m$^2$/gram, and a DBP absorption of 122 cm$^3$/100 grams, marketed by Phillips Chemical Company, a subsidiary of Phillips Petroleum Company.

Extender Oils

The extender oil optionally employed in the compounded stocks of this invention can be a paraffinic, naphthenic, or aromatic mineral oil, or mixtures thereof.

The most useful oils are those having a specific gravity ranging from such as about 0.85 to 1.05. Presently preferred are the highly aromatic oils having a specific gravity of about 0.95 to 1.02. Presently most preferred is an ASTM D 2226, Type 101 aromatic hydrocarbon oil having a specific gravity of about 0.97, such as Philrich 5 marketed by Phillips Petroleum Company.

Other Components

My inventive, low-scorch rubber compositions also can contain various antidegradants (antioxidants, antiozonants) such as Flexamine G and Flexzone 3C, amine-type antidegradants marketed by Uniroyal Chemical Company, and AgeRite Resin D, a quinoline-type antidegradant marketed by R. T. Vanderbilt Company, as well as colorants, and the like, as known in the compounding arts.

Presently Preferred Rubber Compositions

The preferred curative system for my inventive rubber compositions comprises sulfur, zinc oxide, and stearic acid.

The preferred compositions of my invention exhibiting desirably long times-to-scorch and low hysteresis comprise:

| Conjugated diene polymer | 100 parts by weight |
|---|---|
| Siliceous Filler | 20–100 parts by weight |
| Mercaptoalkoxysilane Coupling Agent | 1–10 parts by weight |
| Benzothiazyl Sulfenamide Accelerator | 1.6–5 parts by weight |
| Sulfur | 1–5 parts by weight |
| Zinc Oxide | 2–6 parts by weight |
| Stearic Acid | 1–5 parts by weight |
| Carbon Black | 0–30 parts by weight |
| Extender Oil | 5–60 parts by weight |
| Antidegradants | 1–4 parts by weight |

One of the presently more preferred embodiments of my invention comprises either 100 parts by weight of natural rubber, or 100 parts by weight of a mixture of about 70 percent by weight of natural rubber and 30 percent by weight of cis-polybutadiene; about 40 parts by weight of Hi Sil 233 silica; about 3 parts by weight of 3-mercaptopropyl-trimethoxysilane coupling agent; about 1.6 to 3.0 parts by weight of a benzothiazyl sulfenamide accelerator, preferably N-cyclohexyl-2-benzothiazyl sulfenamide; about 2 parts by weight of sulfur; about 4 parts by weight of zinc oxide; about 2.5 parts by weight of stearic acid; about 2.5 parts by weight of amine-type antidegradants; about 10 parts by weight of a highly aromatic extender oil; and about 18 parts by weight of carbon black.

Another presently preferred embodiment comprises 100 parts of a mixture comprising about 60 percent by weight of a butadiene/styrene copolymer having a bound styrene content of 23.5 percent by weight and about 40 percent by weight of cis-polybutadiene; about 75 parts by weight of Hi Sil 233 silica; about 3 parts by weight of 3-mercaptopropyl-trimethoxysilane coupling agent; about 3 parts by weight of a benzothiazyl sulfenamide accelerator, preferably N-t-butyl-2-benzothiazyl sulfenamide; about 2 parts by weight of sulfur; about 3 parts by weight of zinc oxide; about 2 parts by weight of stearic acid; about 2.5 parts by weight of a mixture of amine and quinoline-type antidegradants; and about 40 parts by weight of a highly aromatic extender oil.

My inventive rubber compositions can be prepared by any suitable mixing means such as in an internal mixer, conveniently such as in a "BR" Banbury mixer at a low speed and low water temperature, and subsequently on a roll mill. Vulcanization of my inventive rubber compounds can be accomplished by injection into compression molds and heating at such as about 150° C. for about 30 minutes. Suitable articles of manufacture that can be made of my inventive rubber compounds include tires, tire retreads, and soles. In addition, mechanical goods, e.g., hoses and belts, can be manufactured by extrusion and low-pressure steam-curing.

EXAMPLES

Examples are provided to further an understanding of my invention, without limiting the scope thereof. Particular materials, amounts, conditions, and the like, are intended to be exemplary and not limitative of the reasonable scope of my invention. It will be readily apparent to those skilled in the art that various modifications can be made in the procedures and compositions described in these examples without departing from the scope and spirit of my invention.

In the runs of this Example I, the preparation and properties of vulcanized silica-filled natural rubber compositions comprising Silane A 189 coupling agent and from 1.5 to 3.0 phr (parts by weight per 100 parts by weight of rubber) of Santocure (N-cyclohexyl-2-benzothiazyl sulfenamide) are described. The compositions were prepared according to Recipe I:

Recipe I

|  | Run 1 (Control) | Run 2 (Invention) | Run 3 (Invention) | Run 4 (Invention) |
|---|---|---|---|---|
| SMR-5L Natural Rubber[a], pts by wt. | 100 | 100 | 100 | 100 |
| Philblack N234[b], pts by wt. | 18 | 18 | 18 | 18 |
| HiSil 233 silica[c], pts by wt. | 40 | 40 | 40 | 40 |
| Zinc Oxide, pts by wt. | 4 | 4 | 4 | 4 |
| Stearic Acid, pts by wt. | 2.5 | 2.5 | 2.5 | 2.5 |
| Flexamine[d], pts by wt. | 1.0 | 1.0 | 1.0 | 1.0 |
| Flexzone 3C[d], pts by wt. | 1.5 | 1.5 | 1.5 | 1.5 |
| Philrich 5[e], pts by wt. | 10 | 10 | 10 | 10 |
| Sulfur, pts by wt. | 2 | 2 | 2 | 2 |
| Silane A-189[f], pts by wt. | 3 | 3 | 3 | 3 |
| Santocure[g], pts by wt. | 1.5 | 2.0 | 2.5 | 3.0 |

[a]Standard Malaysian Rubber No. 5L.
[b]A carbon black having an average particle size of 19 millimicrons, an average surface area (BET) of 125 m$^2$/g, and a DBP absorption of 122 cm$^3$/100 g, marketed by Phillips Chemical Company, a subsidiary of Phillips Petroleum Company.
[c]An amorphous, hydrated, precipitated silica having a specific gravity of 2.0 g/cc, a surface area (BET) of about 140 to 160 m$^2$/g, an average diameter of 0.022 microns, a maximum SiO$_2$ hydrate content of 87 weight percent, marketed by PPG Industries.
[d]Amine-type antidegradants marketed by Uniroyal Chemical Company.
[e]A highly aromatic Type-101 oil described in ASTM 2226-79, marketed by Phillips Petroleum Company.
[f]3-mercaptopropyl-trimethoxysilane, marketed by Union Carbide Co.
[g]N—cyclohexyl-2-benzothiazyl sulfenamide, marketed by Harwick Chemical Corp.

The blending of ingredients was carried out in a "BR" Banbury mixer at a rotor speed of 118 rpm for 6–7 minutes while cold water was circulated. Rubber was added at the start; silica, carbon black, antidegradants and Silane A-189 were added in two increments after 0.5 and 1 minute, respectively; and oil was charged 2 minutes after start. The mixture was dumped at 150°–160° C. onto a 6×12" roll mill and sheeted off after 1–2 minutes. The rubber compound was remilled in a Banbury for 1.5 minutes while cold water was circulated. Curatives, including Santocure, were added during this remilling operation after 0.5 minutes. Each rubber composition was dumped at 100° C. and remilled on a 6"×12" roll mill for 5 minutes while water of 70° C. was circulated.

Curing was accomplished in a compression mold at 150° C. for 30 minutes. Physical properties of the vulcanized rubber compounds are listed in Table I:

TABLE I

|  | Run 1 (Control) | Run 2 (Invention) | Run 3 (Invention) | Run 4 (Invention) |
|---|---|---|---|---|
| Scorch, 5 pt. rise[a], minutes | 3.2 | 5.0 | 7.0 | 7.5 |
| Time to 90% Cure[b], minutes | 5.9 | 4.9 | 4.7 | 4.4 |
| Mooney Viscosity at 100° C.[c] | 60 | 52 | 44 | 41 |
| 300% - Modulus,[d], MPa | 11.7 | 13.0 | 15.2 | 16.4 |
| Tensile Strength[d], Mpa | 24.3 | 28.4 | 28.5 | 27.7 |
| Elongation[d], % | 510 | 540 | 510 | 450 |
| Hysteretic ΔT[e], °C. | 22.3 | 21.7 | 20.4 | 20.5 |
| Resilience[f], % | 73 | 72 | 71 | 73 |
| Shore A Hardness[g] | 57 | 62 | 65 | 67 |

[a]Time-to-scorch determined according to ASTM D1646, employing a rotor of 30.48 mm diameter; scorch time was determined for a 5 point rise above the minimum Mooney at 125° C.
[b]ASTM D1646 at 150° C.
[c]ASTM D3346.
[d]ASTM D412, Method A, employing a CRE-2K tensile machine, at 78° F.
[e]ASTM D623, Method A employing a Goodrich flexometer, using a modified specimen size of 0.7" diameter and 1.0" height.
[f]ASTM D945; same specimen size as for [e].
[g]ASTM D2240, Shore durometer, Type A.

Data listed in Table I show the surprising effect that the time-to-scorch was significantly prolonged by increasing the level of a benzothiazyl sulfenamide at over 1.5 phr (parts by weight per 100 parts of rubber). The scorch time was more than doubled by employing 2.5 phr versus 1.5 phr of Santocure. The cure rate was slightly increased by raising the amount of Santocure. The time to 90% cure was shortened by about 20% for 2.5 phr versus 1.5 phr. Minimum Mooney and hysteretic heat generation were lower, and tensile strength, modulus, and Shore A hardness were higher at higher Santocure levels. Run 3 is considered the preferred one of the series described in this example.

EXAMPLE II

In these runs, the preparation and properties of natural rubber/cis-polybutadiene blends containing silica, Silane A-189, and Santocure (at levels above 1.5 phr) are described. Blending and vulcanization conditions were the same as described in Example I. The blend recipes for the rubber compositions are given in Recipe II:

Recipe II

|  | Run 5 (Control) | Run 6 (Invention) | Run 7 (Invention) | Run 8 (Invention) |
|---|---|---|---|---|
| SMR-5L Natural Rubber, pts by wt | 70 | 70 | 70 | 70 |
| Cis-4 1203 Polybutadiene[a], pts by wt | 30 | 30 | 30 | 30 |
| Philblack N 234, pts by wt | 18 | 18 | 18 | 18 |
| HiSil 233 Silica, pts by wt | 40 | 40 | 40 | 40 |
| Zinc Oxide, pts by wt | 4 | 4 | 4 | 4 |
| Stearic Acid, pts by wt | 2.5 | 2.5 | 2.5 | 2.5 |
| Flexamine, pts by wt | 1.0 | 1.0 | 1.0 | 1.0 |
| Flexzone 3C, pts by wt | 1.5 | 1.5 | 1.5 | 1.5 |
| Philrich 5 oil, pts by wt | 10 | 10 | 10 | 10 |
| Sulfur, pts by wt | 2 | 2 | 2 | 2 |
| Silane A-189, pts by wt | 3 | 3 | 3 | 3 |
| Santocure, pts by wt | 1.5 | 2.0 | 2.5 | 3.0 |

[a]a polybutadiene having a cis-configuration of about 91-92% and a Mooney viscosity of about 45 at 212° F.

Physical test data of the vulcanized rubber compounds are summarized in Table II

TABLE II

|  | Run 5 (Control) | Run 6 (Invention) | Run 7 (Invention) | Run 8 (Invention) |
|---|---|---|---|---|
| Scorch, 5 pt. rise, minutes[a] | 4.3 | 5.2 | 6.8 | 10.5 |
| Time to 90% Cure, minutes | 7.2 | 5.6 | 5.4 | 5.4 |
| Mooney Viscosity at 100° C. | 81 | 66 | 66 | 55 |
| 300% Modulus, MPa | 10.2 | 12.3 | 13.9 | 14.8 |
| Tensile Strength, MPa | 24.2 | 24.3 | 23.6 | 24.1 |
| Elongation, % | 530 | 500 | 440 | 440 |
| Hysteretic ΔT, °C. | 23.9 | 20.9 | 19.9 | 19.1 |
| Resilience, % | 72 | 75 | 76 | 77 |
| Shore A Hardness | 61 | 63 | 65 | 66 |

[a]ASTM D1646 at 125° C.

Data in Table II show prolonged scorch time, lower Mooney, lower 90%-cure time, lower hysteretic heat build-up, and slightly higher resilience and Shore A hardness as beneficial effects of my higher levels of a benzothiazyl sulfenamide.

EXAMPLE III

These runs compare the effects of different benzothiazyl sulfenamides employed at a level of about 2 phr upon silica-filled, Silane A-189 coupled rubber compounds. Blend compositions are given in Recipe III:

Recipe III

|  | Run 9 (Invention) | Run 10 (Invention) | Run 11 (Invention) | Run 12 (Invention) |
|---|---|---|---|---|
| SBR 1712[a], pts by wt. | 82.5 | 82.5 | 82.5 | 82.5 |
| Cis-4 1203, pts by wt. | 40 | 40 | 40 | 40 |
| Hi Sil 233, pts by wt. | 75 | 75 | 75 | 75 |
| Philrich 5, pts by wt. | 17.5 | 17.5 | 17.5 | 17.5 |
| Zinc Oxide, pts by wt. | 3 | 3 | 3 | 3 |
| Stearic Acid, pts by wt. | 2 | 2 | 2 | 2 |
| Sulfur, pts by wt. | 2 | 2 | 2 | 2 |
| Agerite Resin D[b], pts by wt. | 1 | 1 | 1 | 1 |
| Flexzone 3C, pts by wt. | 1.5 | 1.5 | 1.5 | 1.5 |
| Silane A-189, pts by wt. | 3 | 3 | 3 | 3 |
| Santocure, pts by wt. | 3 | — | — | — |
| NOBS Special[c], pts by wt. | — | 3 | — | — |
| Santocure NS[d], pts by wt. | — | — | 3 | — |
| Vulkazit DZ[e], pts by wt. | — | — | — | 3 |

[a]An emulsion-polymerized butadiene-styrene copolymer having a bound styrene content of about 23.5 weight percent, extended with about 37.5 highly aromatic oil parts by weight per 100 parts by weight of copolymer (phr), minimum Mooney 46-50 at 212° F.
[b]A quinoline-type antioxidant/antiozonant marketed by R. T. Vanderbilt Co.
[c]2(4-morpholinothio)-benzothiazole, also called N—oxydiethylene-2-benzothiazyl sulfenamide, marketed by American Cyanamid Co.
[d]N—t-butyl-2-benzothiazyl sulfenamide marketed by Harwick Chemical Corp.
[e]N,N—dicyclohexyl-benzothiazyl sulfenamide marketed by Mobay Chemical Co.

Mixing of the ingredients of the rubber blends was carried out in a "BR" Banbury for 9 minutes at a rotor speed of 118 rpm according to the following schedule: one half of silica and silane coupling agent was added to the rubber after 1 minute; the rest of the silica and silane was added 2 minutes after start; oil was charged in 4 equal increments at about one-minute intervals; stearic acid was charged about 2 minutes before dumping at 160° C. Milling was carried out for 1-2 minutes on a 6"×12" roll mill at a temperature of 40° C. The remilling was done according to the procedure described in Example I.

The rubber compounds were cured in a compression mold at 150° C. for 30 minutes. Physical properties are listed in Table III:

TABLE III

|  | Run 9 (Invention) | Run 10 (Invention) | Run 11 (Invention) | Run 12 (Invention) |
|---|---|---|---|---|
| Scorch, 5 pt. Rise[a], minutes | 19.8 | 21.5 | 19.7 | 10.0 |

TABLE III-continued

|  | Run 9 (Invention) | Run 10 (Invention) | Run 11 (Invention) | Run 12 (Invention) |
|---|---|---|---|---|
| Time to 90% Cure, minutes | 23.0 | 32.0 | 21.6 | 17.0 |
| Mooney Viscosity, at 100° C. | 68 | 66 | 72 | 69 |
| 300% - Modulus, MPa | 7.4 | 5.3 | 8.3 | 8.2 |
| Tensile Strength, MPa | 20.7 | 20.9 | 22.6 | 22.1 |
| Elongation, % | 600 | 720 | 590 | 590 |
| Hysteretic ΔT, °C. | 25.7 | 33.5 | 23.7 | 24.0 |
| Resilience, % | 71 | 66 | 73 | 72 |
| Shore A Hardness | 60 | 60 | 61 | 61 |

(a) ASTM D 1646 at 140° C.

Data in Table III show that Santocure, NOBS Special, and Santocure NS (Runs 9, 10, 11) were most effective in prolonging the scorch time of silica-filled natural rubber/SBR blends containing Silane A-189 coupling agent. Run 10 employing NOBS Special appeared undercured as compared to the other runs as indicated by a high hysteretic ΔT, a low modulus, and a low cure rate (high time to 90% cure). The composition of Run 11 employing Santocure NS exhibited most desirable physical properties.

EXAMPLE IV

Data in these runs demonstrate that the scorch prolongation of silica-filled rubber compounds by employing benzothiazyl sulfenamide accelerators at levels of at least over 1.5 phr was not observed in the absence of an alkoxymercaptosilane coupling agent, e.g., Silane A-189.

Compounding of four control rubber compositions without Silane A-189 was carried out according to the general procedure described in Example I and according to Recipe IV (identical to Recipe II except for the absence of Silane A-189):

Recipe IV

|  | Run 13 (Control) | Run 14 (Control) | Run 15 (Control) | Run 16 (Control) |
|---|---|---|---|---|
| SMR-5L Natural Rubber, pts by wt. | 70 | 70 | 70 | 70 |
| Cis-4 1203 Polybutadiene, pts by wt. | 30 | 30 | 30 | 30 |
| Philblack N-234, pts by wt. | 18 | 18 | 18 | 18 |
| HiSil 233 Silica, pts by wt. | 40 | 40 | 40 | 40 |
| Zinc Oxide, pts by wt. | 4 | 4 | 4 | 4 |
| Stearic Acid, pts by wt. | 2.5 | 2.5 | 2.5 | 2.5 |
| Flexamine, pts by wt. | 1.0 | 1.0 | 1.0 | 1.0 |
| Flexzone 3C, pts by wt. | 1.5 | 1.5 | 1.5 | 1.5 |
| Philrich 5 oil, pts by wt. | 10 | 10 | 10 | 10 |
| Sulfur, pts by wt. | 2 | 2 | 2 | 2 |
| Santocure, pts by wt. | 1.5 | 2.0 | 2.5 | 3.0 |

Properties of cured control compositions without Silane A-189 are listed in Table IV. Curing conditions were identical to those of Examples I, II and III.

TABLE IV

|  | Run 13 (Control) | Run 14 (Control) | Run 15 (Control) | Run 16 (Control) |
|---|---|---|---|---|
| Scorch, 5 pt. Rise, minutes(a) | 19.2 | 20.5 | 19.5 | 19.1 |
| Time to 90% cure, minutes | — | — | — | — |
| Mooney Viscosity, at 100° C. | 87 | 84 | 78 | 80 |
| 300% - Modulus, MPa | 4.8 | 5.6 | 6.6 | 7.2 |
| Tensile Strength, MPa | 19.3 | 19.8 | 20.5 | 20.0 |
| Elongation, MPa | 680 | 620 | 590 | 550 |
| Hysteretic ΔT, °C. | >50 | 37.3 | 31.0 | 27.0 |
| Resilience, % | 66 | 69 | 72 | 74 |
| Shore A Hardness | 61 | 62 | 63 | 66 |

(a) ASTM D1646 at 125° C.

Data in Table IV clearly demonstrate that in the absence of Silane A-189 that an increase in the amount of Santocure did not prolong scorch and reduce the hysteretic heat in generation. However, the presence of Silane A-189 the above-mentioned benefits were observed as has been shown in Table II.

Therefore, the desirable effects caused by benzothiazyl sulfenamides at levels at above 1.5 phr occur only in the presence of a mercaptoalkoxysilane coupling agent in silica-filled rubber compositions.

The disclosure, including date, illustrates the value and effectiveness of my invention. The examples, the knowledge and background of the field of the invention, general principles of chemistry, and other applicable sciences, have formed the bases from which the broad descriptions of my invention, including the ranges of conditions and generic groups of operant components, have been developed, and which have formed the bases for my claims here appended.

I claim:

1. A sulfur-vulcanizable rubber compound exhibiting prlonged time-to-scorch comprising at least one sulfur-vulcanizable diene rubber,
    a siliceous filler,
    a silane coupling agent consisting of a mercaptoalkyltrialkoxysilane coupling agent represented by $(OR)_3SiR^1SH$ wherein R and $R^1$ each represent an alkyl group of 1 to 10 carbon atoms per molecule, and
    a benzothiazyl sulfenamide accelerator at a level of about 2 phr and above.
2. The composition according to claim 1 wherein said sulfur-vulcanizable diene rubber is selected from the group consisting of natural rubbers, synthetic conjugated diene rubbers, and mixtures.
3. The composition according to claim 2 further employing a carbon black with said siliceous filler.
4. The composition according to claim 1 wherein said siliceous filler is an amorphous silica, finely divided clay, kaolin, hydrated aluminum silicate, magnesium silicate, calcium silicate, or mixture thereof.
5. The composition according to claim 3 employing a ratio of about 1:99 to 99:1 weight ratio of carbon black:siliceous filler.
6. The composition according to claim 5 wherein said carbon black:siliceous filler ratio is in the range of about 1:20 to 1:1.
7. The composition according to claim 6 wherein said sulfur-vulcanizable diene rubber comprises an admixture of a synthetic diene rubber and a natural rubber.
8. The composition according to claim 1 or 3 employing a weight ratio of mercaptoalkyltrialkoxysilane coupling agent:siliceous filler of about 1:100 to 1:5.
9. The composition according to claim 8 wherein said mercaptoalkyltrialkoxysilane coupling agent is selected from the group consisting of 3-mercaptopropyltrimethoxysilane, 3-mercaptopropyltriethyoxysilane, 2-mercaptoethyltrimethyoxysilane, 2-mercaptoethyltriethoxysilane, and mixtures.

10. The composition according to claim 8 further incorporating an extender oil.

11. The composition according to claim 1 or 3 wherein said benzothiazyl sulfenamide vulcanization accelerator is represented by the general formula:

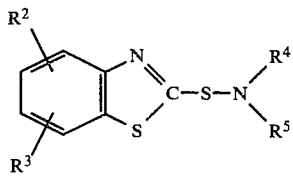

wherein each $R^2$ and $R^3$ is individually selected from the group consisting of hydrogen, nitro, chloro, alkyl radicals having 1 to 4 carbon atoms, and alkoxy radicals having 1 to 4 carbon atoms; $R^4$ is selected from the group consisting of alkyl radicals having 1 to 6 carbon atoms, and aryl radicals having 6 to 13 carbon atoms; $R^4$ and $R^5$ can be joined through a member selected from the group consisting of —CH$_2$—, —O—, and —S— to constitute with the attached nitrogen group a heterocyclic radical; and $R^5$ is individually selected from the group consisting of $R^4$ and hydrogen.

12. The composition according to claim 11 wherein said benzothiazyl sulfenamide accelerator is selected from the group consisting of N-t-butyl-2-benzothiazyl sulfenamide, N-cyclohexyl-2-benzothiazyl sulfenamide, N-isopropyl-2-benzothiazyl sulfenamide, N-oxydiethylene-2-benzothiazyl sulfenamide, N,N-diisopropyl-2-benzothiazyl sulfenamide, N,N-diethyl-2-benzothiazyl sulfenamide, N,N-dicyclohexyl-2-benzothiazyl sulfenamide, 2-(4-morpholinodithio)-benzothiazole, and mixtures.

13. The composition according to claim 12 further incorporating an extender oil.

14. The composition according to claim 1 or 3, further incorporating an extender oil.

15. The composition according to claim 14 comprising:

| | |
|---|---|
| Conjugated diene polymer | 100 parts by weight |
| Siliceous Filler | 20–100 parts by weight |
| Mercaptoalkyltrialkoxysilane Coupling Agent | 1–10 parts by weight |
| Benzothiazyl Sulfenamide Accelerator | 2–5 parts by weight |
| Sulfur | 1–5 parts by weight |
| Zinc Oxide | 2–6 parts by weight |
| Stearic Acid | 1–5 parts by weight |
| Carbon Black | 0–30 parts by weight |
| Extender Oil | 5–60 parts by weight |
| Antidegradants | 1–4 parts by weight. |

16. The composition according to claim 14 comprising 100 parts by weight of a diene rubber selected from natural rubber and admixtures of a natural rubber with a cis-polybutadiene, about 40 parts by weight silica, about 3 parts by weight 3-mercaptopropyl-trimethoxysilane, about 2 to 3 parts by weight benzothiazyl sulfenamide, about 2 parts by weight sulfur, about 4 parts by weight zinc oxide, about 2.5 parts by weight stearic acid, about 2.5 parts by weight amine-type antidegradant, about 10 parts by weight highly aromatic extender oil, and about 18 parts by weight carbon black N 234.

17. The composition according to claim 14 comprising about 60 parts by weight of a butadiene/styrene copolymer, about 40 parts by weight cis-polybutadiene, about 75 parts by weight silica, about 3 parts by weight 3-mercaptopropyl-trimethoxysilane, about 3 parts by weight benzothiazyl sulfenamide, about 2 parts by weight sulfur, about 3 parts by weight zinc oxide, about 2 parts by weight stearic acid, about 2.5 parts by weight of a mixture of amine and quinoline antidegradant, and about 40 parts by weight aromatic extender oil.

18. The composition according to claim 1 or 3, cured.
19. The composition according to claim 8 cured.
20. The composition according to claim 11 cured.
21. The composition according to claim 14 cured.
22. The composition according to claim 15 cured.
23. The composition according to claim 16 cured.
24. The composition according to claim 17 cured.

* * * * *